United States Patent
Platto et al.

(10) Patent No.: US 8,608,219 B1
(45) Date of Patent: Dec. 17, 2013

(54) POWER TAILGATE RACK

(71) Applicant: Ford Global Technologies, LLC, Dearborn, MI (US)

(72) Inventors: Gordon M Platto, Troy, MI (US); David Michael Lechkun, Shelby Township, MI (US); Paul Geoffrey Roberts, Livonia, MI (US); Terry Lee Steller, Ann Arbor, MI (US); William K. Moore, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/724,227

(22) Filed: Dec. 21, 2012

(51) Int. Cl.
*B60R 9/06* (2006.01)
*B62D 33/03* (2006.01)

(52) U.S. Cl.
USPC ........... 296/3; 296/26.05; 296/57.1; 296/37.6

(58) Field of Classification Search
USPC ........... 296/3, 26.01, 26.02, 26.05, 26.09, 50, 296/51, 57.1, 37.6, 26.04, 37.7
See application file for complete search history.

(56) References Cited

U.S. PATENT DOCUMENTS

| | | | |
|---|---|---|---|
| 3,728,537 A * | 4/1973 | Barenyi et al. ................. | 362/493 |
| 4,601,511 A * | 7/1986 | Nakamura et al. ............. | 296/210 |
| 4,957,400 A * | 9/1990 | Karp ............................. | 410/110 |
| 4,984,837 A * | 1/1991 | Dise ................................. | 296/3 |
| 6,027,161 A * | 2/2000 | Gondo ........................... | 296/214 |
| 6,332,637 B1 | 12/2001 | Chambers | |
| 6,364,392 B1 * | 4/2002 | Meinke ........................... | 296/62 |
| D481,987 S * | 11/2003 | MacWilliam et al. ....... | D12/401 |
| 6,698,810 B1 * | 3/2004 | Lane ................................. | 296/3 |
| D489,672 S * | 5/2004 | Robinson et al. ............ | D12/401 |
| 6,761,387 B2 | 7/2004 | Sloss | |
| 6,886,877 B1 * | 5/2005 | Plavetich et al. ............. | 296/57.1 |
| 6,923,488 B2 * | 8/2005 | Bruford et al. ............... | 296/57.1 |
| 6,935,671 B2 * | 8/2005 | Bruford et al. ............... | 296/57.1 |
| 6,988,756 B1 * | 1/2006 | Meinke et al. .................. | 296/50 |
| 6,991,277 B1 * | 1/2006 | Esler .............................. | 296/50 |
| 7,070,222 B2 * | 7/2006 | Bruford et al. ............... | 296/57.1 |
| 7,234,749 B1 * | 6/2007 | Firzlaff et al. ............... | 296/57.1 |
| 7,267,387 B1 * | 9/2007 | Bruford et al. ............... | 296/57.1 |
| 7,287,798 B2 * | 10/2007 | King ............................. | 296/57.1 |
| 7,472,938 B2 * | 1/2009 | Firzlaff et al. ............... | 296/57.1 |
| D585,811 S * | 2/2009 | Win .............................. | D12/401 |
| D586,721 S * | 2/2009 | Hildebrand et al. ......... | D12/401 |
| 7,494,169 B2 * | 2/2009 | Collins ............................ | 296/3 |
| 7,533,921 B2 * | 5/2009 | Ferrell ......................... | 296/57.1 |
| 7,712,811 B2 * | 5/2010 | Heaman et al. ............. | 296/26.08 |
| 7,802,842 B2 * | 9/2010 | Vogt et al. ..................... | 296/210 |
| 7,976,089 B2 * | 7/2011 | Jones .............................. | 296/36 |

* cited by examiner

*Primary Examiner* — Glenn Dayoan
*Assistant Examiner* — Gregory Blankenship
(74) *Attorney, Agent, or Firm* — Frank A. MacKenzie; Brooks Kushman P.C.

(57) ABSTRACT

A vehicle tailgate is provided with a rack having a transverse cross-member extendable vertically between raised and lowered positions with telescoping supports. A powered cable-drive is connected to the supports move the cross-member between the raised and lowered positions. When the rack is in the lowered position, the cable-drive and supports are concealed within the tailgate and the cross-member forms at least a portion of a top surface of the tailgate.

16 Claims, 4 Drawing Sheets

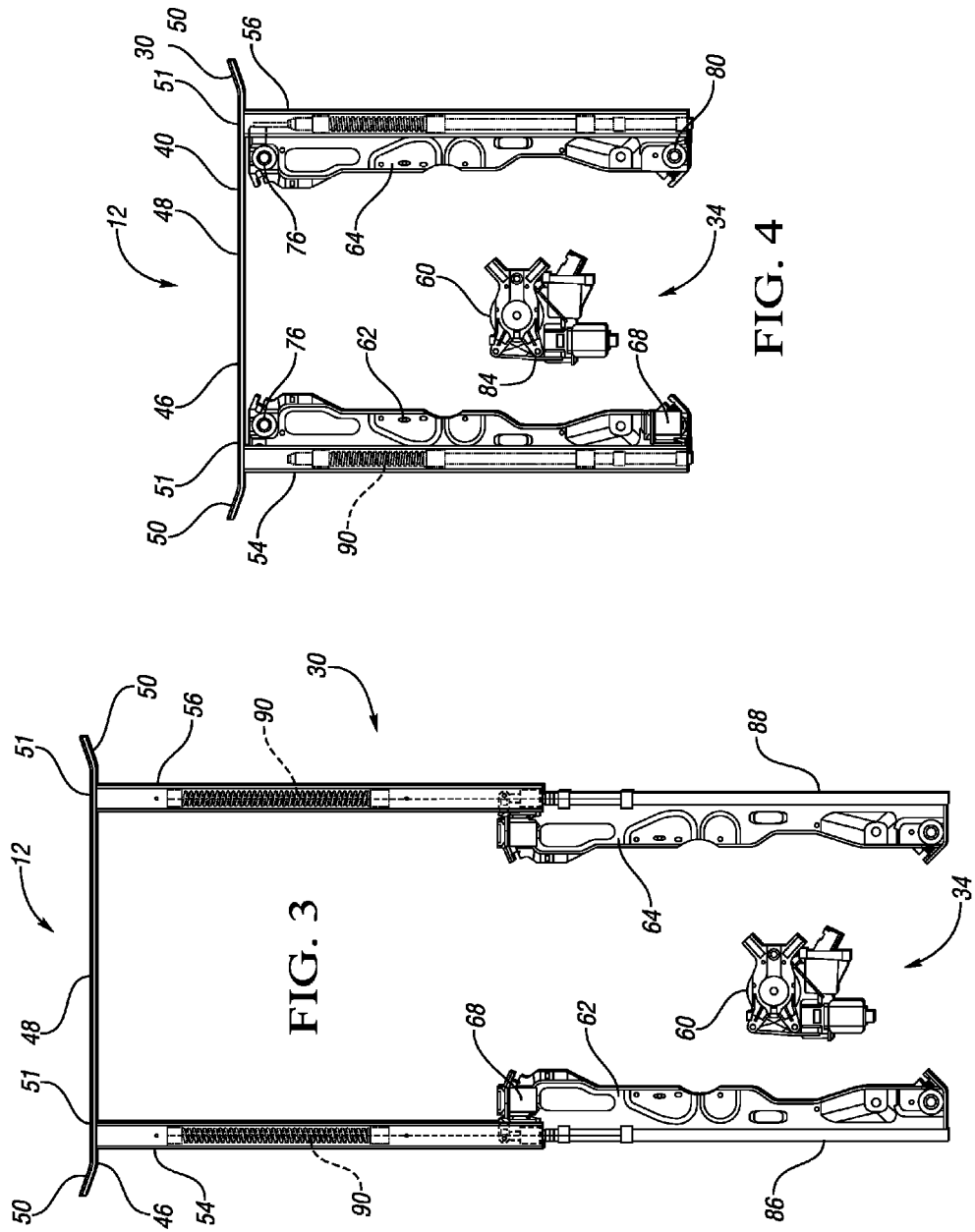

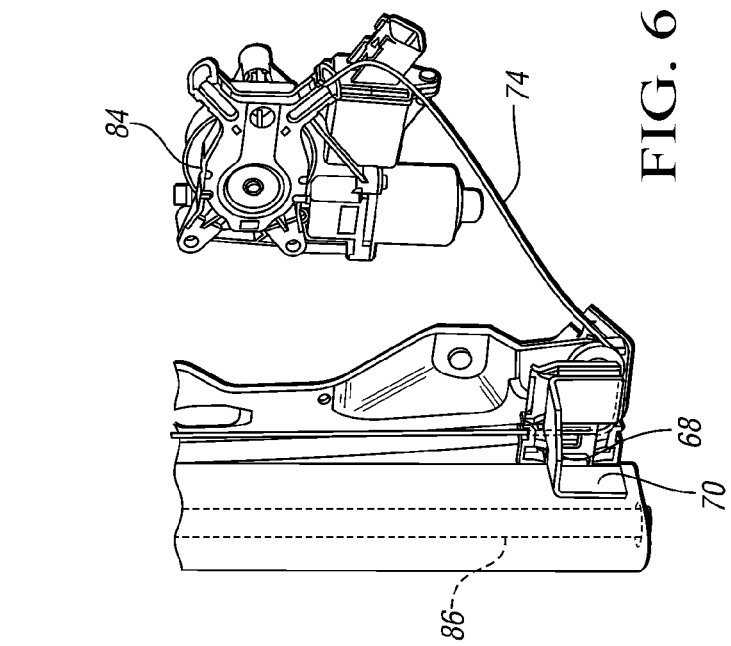
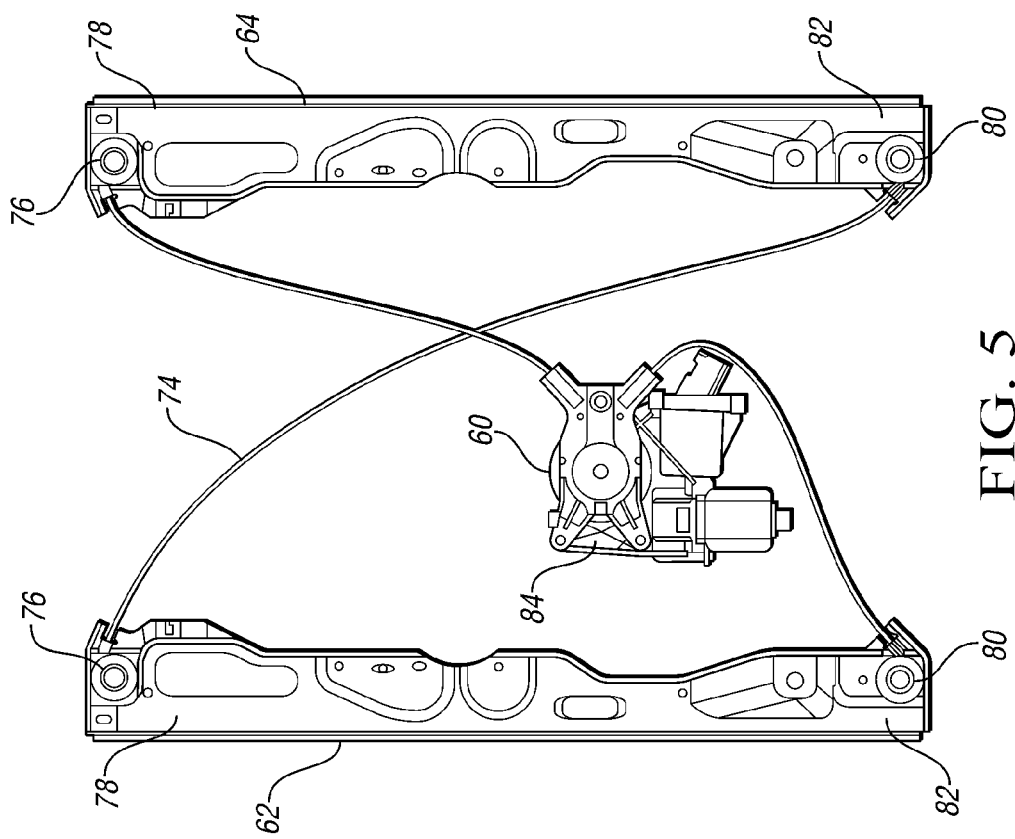

POWER TAILGATE RACK

TECHNICAL FIELD

The present disclosure relates to a tailgate rack and system for pickup truck or utility vehicle.

BACKGROUND

Pickup trucks or utility vehicles having a cargo bed are useful for transporting cargo, especially cargo which is too large or undesirable to transport in the passenger cabin of the vehicle. However, cargo which exceeds the length of the truck bed can still difficult to transport and secure safely.

SUMMARY

In one embodiment, a vehicle tailgate is provided with a rack having a transverse cross-member extendable vertically between raised and lowered positions with telescoping supports. A powered cable-drive is connected to the supports to move the cross-member between the raised and lowered positions. When the rack is in the lowered position, the cable-drive and supports are concealed within the tailgate and the cross-member forms at least a portion of a top surface of the tailgate.

In another embodiment, the tailgate includes a guide bracket mounted to an interior surface of the tailgate and at least one pulley mounted to the guide bracket. The cable drive includes a cable engaged with the pulley and a carrier clamp mounted to the cable and the supports. The carrier clamp is translated along the guide bracket with the cable thereby translating the support and moving the cross-member between the raised and lowered positions.

In another embodiment, the transverse cross-member includes a concave profile.

In another embodiment, the telescoping supports include a biasing member. When the supports are moved upwards, the rack is biased toward the raised position.

In another embodiment, the rack includes a transverse cross-member extendable vertically by a pair of telescoping support arms.

In one other embodiment, a vehicle is provided. The vehicle includes an exposed cargo bed having a rear tailgate. A rack is extendable vertically from the tailgate. A trough is formed in a roof of a passenger cabin. The trough and the rack are generally coplanar when the rack is in an extended position in order to secure cargo, that exceeds the length of the bed, between the trough and the rack.

In another embodiment, the trough extends the entire length of the passenger cabin.

In another embodiment, the trough includes an increased friction material.

In another embodiment, the rack includes a transverse cross-member and when the rack is in the lowered position, the cross-member forms at least a portion of a top surface of the tailgate.

In another embodiment, the rack is extendable vertically from the tailgate between raised and lowered positions with telescoping support arms. A powered lift actuator moves the rack between the raised and lowered positions. The actuator and support arms are concealed within the tailgate when the rack is in the lowered position.

In another embodiment, the vehicle also includes a guide bracket mounted to an interior surface of the tailgate and at least one pulley mounted to the guide bracket, wherein the powered lift actuator includes a cable drive and a cable engaged with the pulley and a carrier clamp mounted to the cable and the support, wherein the carrier clamp is translated along the guide bracket with the cable thereby translating the support and moving the rack between the raised and lowered positions.

In another embodiment, the rack extends vertically a distance of at least 100 cm.

In another embodiment, rack includes a transverse cross-member having a concave profile that generally corresponds to a profile of the trough.

In one other embodiment, a vehicle tailgate is provided with a rack extendable vertically from the tailgate between raised and lowered positions with telescoping at least one support arm. A powered lift actuator moves the rack between the raised and lowered positions. The actuator and support arm are concealed within the tailgate when the rack is in the lowered position.

In another embodiment, the rack includes a transverse cross-member extendable vertically by a pair of telescoping support arms.

In another embodiment, the powered lift actuator includes a powered cross-cable drive connected to at least one of the support arms.

In another embodiment, the tailgate further includes a pair of guide brackets mounted to an interior surface of the tailgate and a plurality of pulleys mounted to the pair of guide brackets. The cross-cable drive includes a cable engaged with the pulleys and a carrier clamp mounted to the cable and at least one of the support arms. The carrier clamp is translated along at least one of the guide brackets with the cable thereby translating at least one of the support arms and moving the rack between the raised and lowered positions.

BRIEF DESCRIPTION OF THE DRAWINGS

FIG. 3 is a cut-away view of the tailgate of FIG. 1 showing the power tailgate rack in a raised position;

FIG. 4 is a cut-away view of the tailgate of FIG. 1 showing the power tailgate rack in a lowered position;

FIG. 5 is a view of a portion of the power tailgate rack; and

FIG. 6 is a detailed view of a portion of the power tailgate rack.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
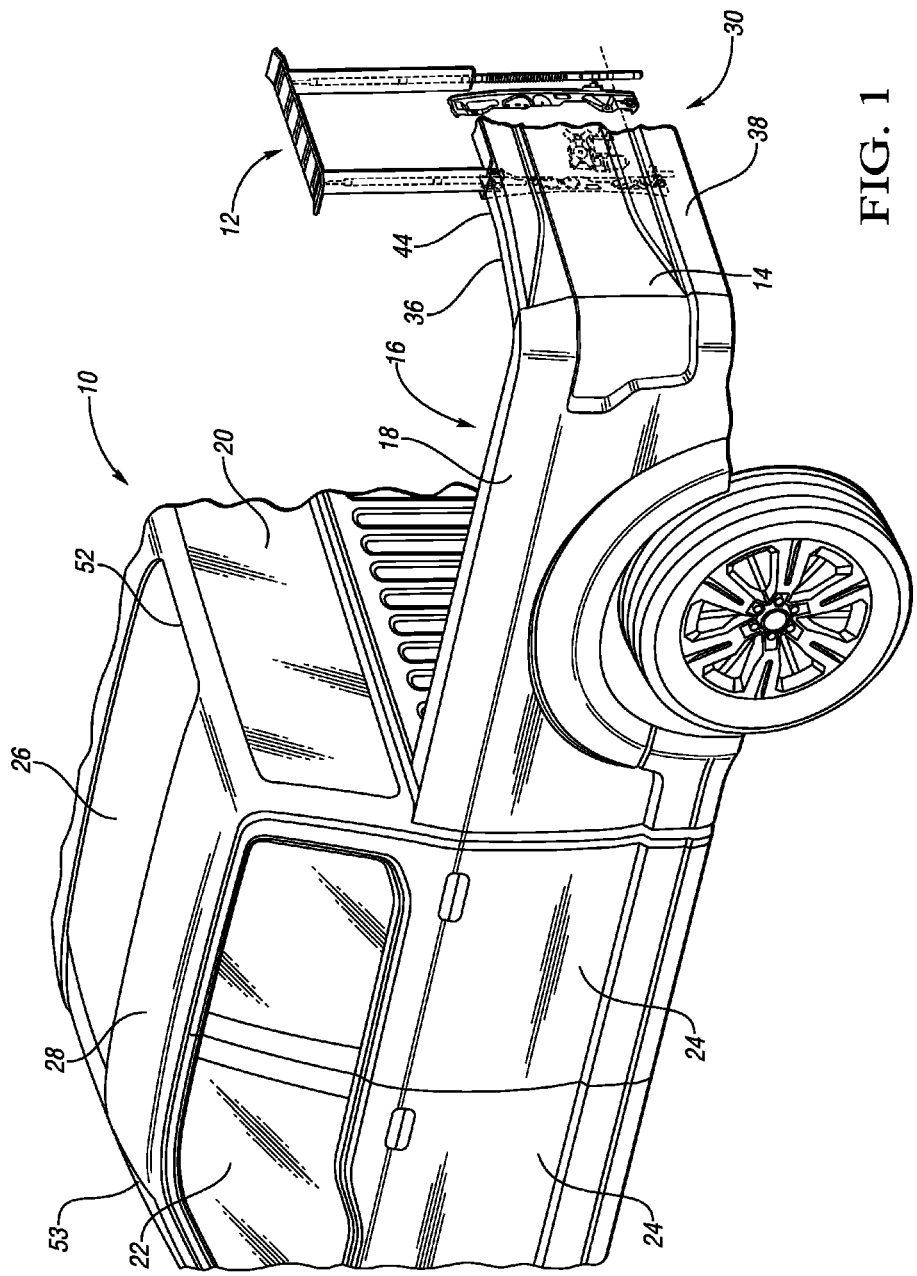
FIG. 1 is a perspective view of the vehicle having a power tailgate rack according to the one embodiment of the disclosure.
Figure 2:
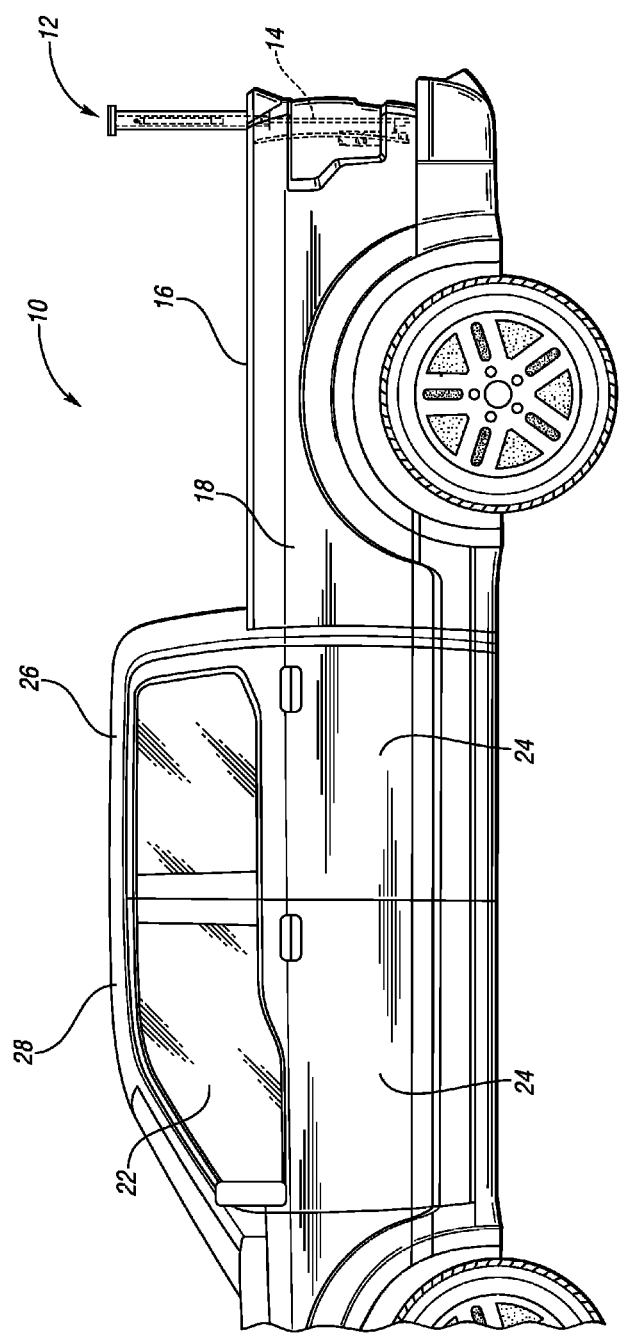
FIG. 2 is a side view of the vehicle and the power tailgate rack of FIG. 1.

FIG. 1 illustrates a perspective view of the vehicle 10 including a power tailgate rack 12. As shown in FIG. 1, a tailgate 14 forms the rear end of the vehicle 10. As illustrated in FIG. 1, the vehicle 10 is a pickup truck and the tailgate 14 forms a rear door to enclose the pickup bed 16. The tailgate 14 can pivot on a horizontal access to open and close. In an open position, the tailgate 14 may be generally parallel to the ground and may also be generally parallel to a floor of the pickup bed 16. In the closed position, as shown in FIG. 1, the tailgate 14 is generally vertical.

The pickup bed 16 is defined between two rear body panels 18 and the tailgate 14 and a front wall 20 of the pickup truck bed. The wall 20 may also define the front wall of the truck passenger cabin 22. As shown in FIG. 1, the truck cabin 22 may have four doors 24, however other truck cabin configurations are contemplated. Pickup trucks, like the vehicle 10 illustrated in FIG. 1, are useful in transporting a variety of cargo without having to get the passenger cabin dirty or reconfigure seating. Pickup truck beds 16 come in a variety of lengths depending on the vehicle. However, even with the longest pickup truck bed, is still difficult to fit some large cargo in the pickup truck bed 16 securely. The tailgate rack 12 allows for some cargo to the more securely carried in the pickup truck bed 16. The tailgate rack may also be used with a trough 26 formed in the vehicle roof 28.

FIG. 3 and FIG. 4 illustrate a power tailgate rack assembly 30 in a raised and a lowered position, respectively. The power tailgate rack assembly 30 includes the tailgate rack 12 and a power lift assembly 34 for raising and lowering the tailgate rack 12. The power tailgate rack assembly 30 is embedded in the tailgate 14. In the lowered position, the power tailgate rack assembly is enclosed by an inner door panel 36 facing the truck bed 16 and an outer door panel 38 facing the rear of the vehicle 10.

The tailgate rack 12 includes a transverse cross member 40. In the lowered position, the transverse cross member 40 is flush with a top surface 44 of the tailgate 14 to form a continuous top surface. The transverse cross member 40 may have a concave profile 46. The transverse cross member's 40 concave profile 46 may formed by a generally planar center portion 48 and a pair of angled walls 50 extending from the distal ends 51 of the center portion 48. In the lowered position, the center portion 48 maybe offset from the planar top surface 44 of the tailgate 14. The concave profile 46 may enable cargo supported by the tailgate rack 12 along the center portion 48 to be held more securely in place between the angled walls 50. The concave profile 46 may help secure cargo which extends beyond the pickup bed 16 whether the tailgate rack 12 is in the raised or lowered position.

Turning back to FIG. 1, the roof trough 26 may also have a concave profile 52. The trough profile 52 may correspond and be generally parallel and coplanar to the concave profile 46 of the tailgate rack 12 when the tailgate rack 12 is in the fully raised position. The roof trough 26 may have a rubber surface, for example, in order to provide greater friction and prevent sliding of cargo that is positioned between the roof trough 26 and the tailgate rack 12. Alternatively, the roof trough 26 maybe coded any suitable increased friction surface material. Likewise the top surface of the transverse cross member 40 may be coded in a rubber or increased friction surface material.

The roof trough 26 may extend along the length of the roof 28. For example, the roof trough 26 may extend from a windshield 53 to the rear wall 20 of the passenger cabin 22. Cargo that is extra-long, such as lumber or kayaks for example, can then be secured in the trough 26 and the tailgate rack 12 and extend over the windshield 53 and even the front of the vehicle 10.

The transverse cross member 40 extends between support members 54 and 56. While the embodiments illustrated show to support members, any number of support members is contemplated. As illustrated, the support members 54 and 56 are connected to the transverse cross member 40 along the planar center portion 48 adjacent the distal ends 52.

The power tailgate rack assembly 30 also includes the power lift assembly 34 provided between the inner door panel 36 and the outer door panel 38. The power lift assembly 34 is actuated by a power cross cable drive 60. The cross cable drive 60 is disposed between a pair of parallel guide brackets 62 and 64 for holding and transferring power to the tailgate rack 12.

The guide brackets 62 and 64 extend in a generally vertical direction may be secured to the inner door panel 36 or the outer door panel 38 or any support structure in the tailgate 14. The power cable drive 60 is provided with at least one carrier clamp 68 which is adapted to slide or translate along one of the guide brackets 62 or 64. In another embodiment, the powert cable drive 60 is provided with two carrier clamps 68 provided on the both sides to slide along both of the guide brackets 62 and 64. As illustrated in more detail in FIG. 6, the carrier clamp 66 is slidably engaged by and guided by the guide bracket 62 and moveable along the guide bracket 62 in a generally vertical direction. The carrier clamp 68 includes an attachment flange 70 to attach to the support member 54.

FIG. 5 illustrates the power lift assembly 34 with the cables 74 shown. Each guide bracket 62 and 64 includes an upper guide pulley or upper cable guide 76 is provided adjacent to an upper end 78 of the guide brackets 62 and 64. Each guide bracket 62 and 64 also includes a lower guide pulley or lower cable guide 80 is provided adjacent to a lower end 82 of the guide brackets 62 and 64. The cable guides 76 and 80 may be rotatable on a fastener such as a pin fixed to the guide brackets 62 and 64. The cable guides 76 and 80 may be positioned inboard along the pair of guide brackets 62 and 64.

The power cable drive 60 is located between the pair of guide bracket 62 and 64. The power cable drive maybe a cross cable drive 60 including a reversible motor 84 and provided with the drive cables 74 for raising and lowering the tailgate rack 12.

In the embodiment illustrated in FIGS. 3-6 the drive cable 74 extends from the cable drive 60 and is connected to the carrier clamp 68 adjacent the lower cable pulley 80. FIG. 6 illustrates one carrier clamp 68 is shown connected to guide bracket 62 and the support arm 54, a second carrier clamp may be provided and connected to the guide bracket 64 and support arm 56. The drive cable 74 extends to the upper pulley 76 along guide bracket 62 and then the drive cable is routed to the lower pulley 80 lower end 82 of the guide bracket 64. The drive cable 74 extends from the lower pulley 80 to the upper pulley 76 on guide bracket 64. The drive cable 74 intersects itself between the pair of guide brackets 62 and 64 as the cable 74 is routed back to the motor 84. It is also contemplated that the drive cable 74 may include two cables and/or two carrier clamps 68, for example. Alternatively, any suitable crosscable drive may be employed. The power lift assembly 34 including the power cable drive 60 enables the tailgate rack to be extended a long distance, such as 100 cm or more, if required.

As the drive cable 74 is actuated the carrier clamp 68 moves along the guide rail 62 to move the support member 54 to the raised position. In the fully raised position, the carrier clamp 68 is located adjacent the upper pulley 76. The support members 54 and 56 telescopically along guide bars 86 and 88 respectively. The tailgate rack 12 and the support arms 54 and 56 are guided by bars 86 and 88 that pass through the support arms 54 and 56. At least one of the support members 54 and 56 includes a biasing member 90, such as a spring. When the support members 54 and 56 are in the lowered position, the guide bars 86 and 88 may engage the biasing member 90. When the support members 54 and 56 are moved upwards, the tailgate rack 12 is biased toward the raised position.

Locking device for keeping the rack in the raised position when carrying loads? The drive motor 84 uses a worm gear to rotate the cable drive 60 that powers cables. Because of the mechanical advantage of the worm gear, the cable drive 60 cannot back feed the motor 84. When the motor 84 stops the tailgate rack 12 is locked in position. The motor 84 and worm gear prevent the tailgate from lowering unintentionally, even when under load.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle tailgate comprising:
    a rack having a transverse cross-member extendable vertically between raised and lowered positions by telescoping supports; and
    a powered cable-drive connected to the supports to move the cross-member between the raised and lowered positions,
    wherein when the rack is in the lowered position, the cable-drive and supports are concealed within the tailgate and the cross-member forms at least a portion of a top surface of the tailgate.

2. The tailgate of claim 1 further comprising a guide bracket mounted to an interior surface of the tailgate and at least one pulley mounted to the guide bracket, wherein the cable drive includes a cable engaged with the pulley and a carrier clamp mounted to the cable and the support, wherein the carrier clamp is translated along the guide bracket with the cable thereby translating the support and moving the cross-member between the raised and lowered positions.

3. The tailgate of claim 1 wherein the transverse cross-member includes a concave profile.

4. The tailgate of claim 1 wherein the telescoping supports include a biasing member, wherein when the supports are moved upwards, the rack is biased toward the raised position.

5. The tailgate of claim 1 wherein the transverse cross-member extends vertically a distance of at least 100 cm.

6. A vehicle comprising:
    an exposed cargo bed having a rear tailgate;
    a rack extendable vertically from the tailgate; and
    a trough formed in a roof of a passenger cabin,
    wherein the trough and the rack are generally coplanar when the rack is in an extended position in order to secure cargo between the trough and the rack
    wherein the rack includes a transverse cross-member having a concave profile that generally corresponds to a profile of the trough.

7. The vehicle of claim 6 wherein the trough extends the entire length of the passenger cabin.

8. The vehicle of claim 6 wherein the trough includes a friction material that has greater friction than a vehicle body panel.

9. The vehicle of claim 6 wherein the rack includes a transverse cross-member and when the rack is in the lowered position, the cross-member forms at least a portion of a top surface of the tailgate.

10. The vehicle of claim 6 wherein the rack is extendable vertically from the tailgate between raised and lowered positions with telescoping support arms; and
    a powered lift actuator for moving the rack between the raised and lowered positions,
    wherein the actuator and support arms are concealed within the tailgate when the rack is in the lowered position.

11. The vehicle of claim 10 further comprising a guide bracket mounted to an interior surface of the tailgate and at least one pulley mounted to the guide bracket, wherein the powered lift actuator includes a cable drive and a cable engaged with the pulley and a carrier clamp mounted to the cable and the support, wherein the carrier clamp is translated along the guide bracket with the cable thereby translating the support and moving the rack between the raised and lowered positions.

12. The vehicle of claim 6 wherein the rack extends vertically a distance of at least 100 cm.

13. A vehicle tailgate comprising:
    a rack extendable vertically from the tailgate between raised and lowered positions with a pair of telescoping support arms and a transverse cross-member having a concave profile; and
    a powered lift actuator for moving the rack between the raised and lowered positions,
    wherein the actuator and support arm are concealed within the tailgate when the rack is in the lowered position.

14. The tailgate of claim 13 wherein the powered lift actuator includes a powered cross-cable drive connected to at least one of the support arms.

15. The tailgate of claim 14 further comprising a pair of guide brackets mounted to an interior surface of the tailgate and a plurality of pulleys mounted to the pair of guide brackets, wherein the cross-cable drive includes a cable engaged with the pulleys and a carrier clamp mounted to the cable and at least one of the support arms, wherein the carrier clamp is translated along at least one of the guide brackets with the cable thereby translating at least one of the support arms and moving the rack between the raised and lowered positions.

16. The tailgate of claim 13 wherein the rack extends vertically a distance of at least 100 centimeters.

* * * * *